United States Patent
Salje

(10) Patent No.: US 6,662,122 B2
(45) Date of Patent: Dec. 9, 2003

(54) METHOD FOR THE CONTROLLED PROPORTIONING OF LIQUIDS WHILE DISLOCATING A GAS CUSHION

(75) Inventor: Gerhard Salje, Hamburg (DE)

(73) Assignee: Eppendrof AG, Hamburg (DE)

( * ) Notice: Subject to any disclaimer, the term of this patent is extended or adjusted under 35 U.S.C. 154(b) by 0 days.

(21) Appl. No.: 10/123,696

(22) Filed: Apr. 16, 2002

(65) Prior Publication Data

US 2002/0188410 A1 Dec. 12, 2002

(30) Foreign Application Priority Data

Apr. 18, 2001 (DE) .......................... 101 18 875

(51) Int. Cl.[7] .......................... G01F 17/00; G01F 23/00; G01L 7/00; G01N 11/00; G06F 19/00
(52) U.S. Cl. .............................. 702/50; 141/59; 73/295; 73/49.2; 340/605; 340/626; 361/37; 361/120
(58) Field of Search ............................. 702/50; 141/59; 73/49.2, 295; 340/605, 626; 361/37, 120

(56) References Cited

U.S. PATENT DOCUMENTS 5,900,538 A * 5/1999 Bastian ...................... 73/49.2

2002/0011276 A1 * 1/2002 Sander ........................ 141/59

* cited by examiner

Primary Examiner—John Barlow
Assistant Examiner—Aditya Bhat
(74) Attorney, Agent, or Firm—Sidley Austin Brown & Wood, LLP

(57) ABSTRACT

A method for controlled proportioning of liguids with a postive-displacement device (2) for dislocating a gas cushion (17) includes measuring the pressure ($p_{ab}$) in the gas cushion (17) at the time of a complete discharge of a liquid volume, measuring the discharge time ($t_{ab}$) for a complete discharge of the liquid volume and determining the time demand ($\Delta t$) to compress the gas cushion (17) by the postive-displacement device by means of the pressure ($p_{ab}$), the dead volume ($V_o$) of the gas cushion (17), a gas condition equation, and the volumetric gas flow (Q) discharged by the postive-displacement device. A corrected discharge time ($t_{oab}$) is determined as a proportioning control magnitude by a deduction of the time demand ($\Delta t$) from the measured dischage time ($t_{ab}$) with outputting, and/or saving, and/or resorting to the deviation of the corrected discharge time ($t_{oab}$) from a desired discharge time ($t_{soll}$) for regulating the discharge of the liquid volume.

14 Claims, 3 Drawing Sheets

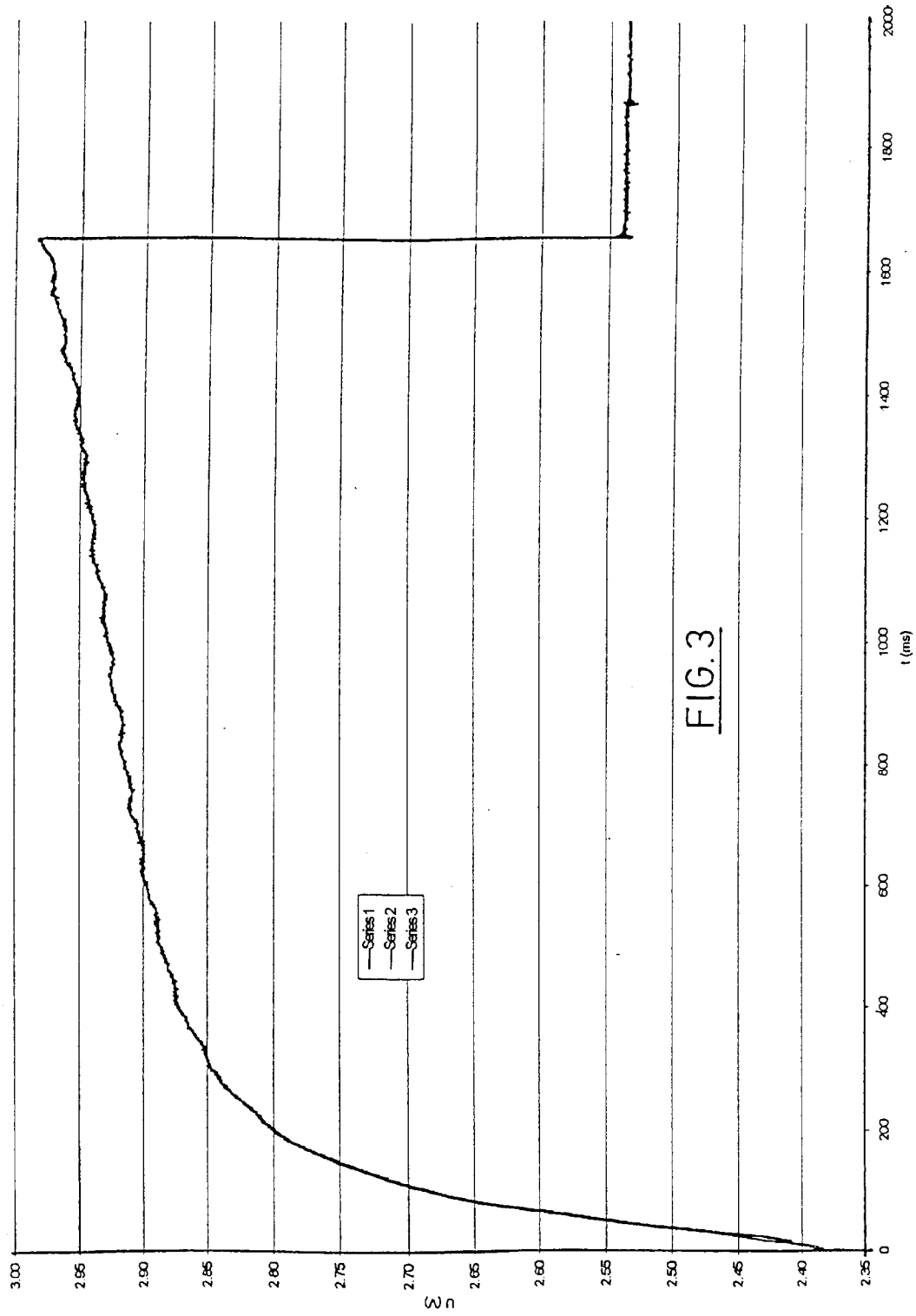

METHOD FOR THE CONTROLLED PROPORTIONING OF LIQUIDS WHILE DISLOCATING A GAS CUSHION

The invention relates to a method for the controlled proportioning of liquids by means of a positive-displacement device to dislocate a gas cushion and a reception volume connected thereto which has an aperture to the environment for the reception and discharge of a liquid by dislocating the gas cushion by means of the positive-displacement device.

The proportioning of liquids while dislocating a gas cushion is performed by means of manual or electric pipettes or automatic proportioning devices. The gas cushion is an air cushion, as a rule. The positive-displacement device is mostly designed as a cylinder having a slidable piston therein. The liquid is mostly received into a pipette tip which can be exchanged. Pipette tips are mostly conceived as disposable articles which can be discarded after a single use. They are made of plastic material, as a rule. The suction and expulsion of the liquid by means of the gas cushion has the advantage that this avoids contaminations of the positive-displacement device and the other re-used components of the proportioning device. A gradual contamination by aerosols or any faulty handling of the proportioning device may be counteracted by filters which are preferably integrated in the pipette tip.

The electric air-cushion pipettes and automatic proportioning devices which are known still are very susceptible with regard to the correctness of the liquid volume discharged and the error in proportioning. They do not even detect major deviations from the desired value of the liquid volume to be discharged, which are caused by a leakage in the proportioning system. Errors in proportioning may also arise while liquids are proportioned under a high vapour pressure. Deviations in the temperature, density, viscosity, and surface tension of the liquid to be proportioned may also cause major errors in proportioning which will not be detected. Errors in handling, e.g. air intake because of too early a withdrawal from the liquid during reception or too small a feed volume, also lead to errors in proportioning.

From U.S. Pat. No. 5,895,838, a method has been known for correcting a temperature-dependent dispensing error in dispensing liquids such as in pipetting, and an apparatus for dispensing liquids such as a pipette which has a higher degree of accuracy. According to the method, dispensing is performed by means of two chambers which are connected to each other via a gas passage. The first chamber, in addition to communicating with the gas passage, communicates with the liquid to be dispensed and the second chamber is gas-tight except for the gas passage. To receive a liquid in the dispensing apparatus, the volume of the second chamber is enlarged, which causes an entry of gas into it from the first chamber and, in turn, an inflow of the liquid to be dispensed into the first chamber until a pressure balance is reached between the chambers. A measurement is made of the change of temperature of the gas flowing from the first chamber into the second chamber and the change in volume which is caused in the second chamber is corrected on the basis of the change of temperature as measured so that the desired amount of liquid is received into the first chamber. A temperature sensor is installed in the second chamber in the vicinity of the gas passage to measure the temperature and a sensor which is mounted in the first chamber may be used in addition. This method is only suitable for the correction of temperature-related errors in proportioning.

From DE 35 31 241 A1, a device has been known for the controlled dispensing of liquids which has a cannula to receive the liquid and an axially movable pressure transducer at one end of the cannula where a connection remaining constant specifically in its volume is disposed between the cannula and the pressure transducer. At least one pressure sensor is disposed between the pressure transducer and the cannula, specifically within the connection, and a regulating connection is provided between the pressure sensor and a driving device for the pressure transducer.

Accordingly, it is the object of the invention to provide an improved method for the controlled proportioning of liquids by means of a gas cushion.

The object is attained by a method having the features of claim 1. It further is attained by a method having the features of claim 10. Advantageous aspects of the methods are set forth in the sub-claims.

The point to start from for the invention is that the error in proportioning which is caused by error sources such as deviations of the vapour pressure, temperature, density, viscosity, and surface tension of the liquid to be proportioned, modifications to the geometry of the pipette tip, leakages of the system, and errors in handling will influence the pressure which prevails in the gas cushion while it is dislocated. The invention involves a measurement of the pressure in the gas cushion to comprise all of the aforementioned error sources.

According to the first approach, in a method for the controlled proportioning of liquids by means of a positive-displacement device to dislocate a gas cushion and a reception volume connected to the positive-displacement device which has an aperture to the environment for receiving and discharging a liquid by dislocating the gas cushion by means of the positive-displacement device, the pressure $p_{ab}$ in the gas cushion is measured at the time of a complete discharge of a liquid volume, the discharge time $t_{ab}$ for a complete discharge of the liquid volume is measured, and the time demand $\Delta t$ to compress the gas cushion by the positive-displacement device is determined by means of the pressure $p_{ab}$, the dead volume $V_o$ of the gas cushion, a gas condition equation, and the volumetric gas flow Q discharged by the positive-displacement device, a corrected discharge time $t_{oab}$ is determined as a proportioning control magnitude by a deduction of the time demand $\Delta t$ from the discharge time $t_{ab}$ measured, and the deviation of the corrected discharge time $t_{oab}$ from a desired discharge time $t_{soll}$ is output and/or is saved and/or is resorted to for regulating the discharge of the liquid volume.

The discharge time $t_{ab}$ is that time which the positive-displacement device needs from the beginning to the end of gas cushion dislocation and, hence, to the time at which the liquid volume is completely discharged. The dead volume $V_o$ of the gas cushion is that volume which the gas cushion has at the beginning of liquid reception. The positive-displacement device simultaneously causes the gas cushion to undergo a dislocation and a compression during the discharge time $t_{ab}$. The dis-location of the gas cushion is matched by the liquid volume discharged. The above error sources have an impact on the discharge time and the extent to which the gas cushion is compressed. As a result, the error in proportioning may be characterized by the time demand $\Delta t$ for the compression of the gas cushion. Thus, the corrected discharge time $t_{oab}$ which results from the reduction of the discharge time $t_{ab}$ by the time demand $\Delta t$ is a control magnitude suited for the proportioning of liquids which allows to discover errors in proportioning. To this effect, the deviation of the corrected discharge time $t_{oab}$ from a desired discharge time $t_{soll}$ may be output, e.g. by signalling the degree of the deviation or, if a tolerable deviation is exceeded, by giving a warning message (e.g. acoustically, optically or in another perceivable form). In addition or instead, the deviation may be saved, e.g. to furnish a proof on how precise a proportioning was. In addition or instead, the deviation may be re-sorted to in order to regulate the discharge of a liquid volume, e.g. by enhancing the accuracy of proportioning from discharge to discharge if the same liquid volume is discharged several times or step by step.

The error in volume (change in volume) $\Delta t\, V$ may be determined by multiplying the time demand $\Delta t$ by the volumetric gas flow Q.

The beginning of the discharge time $t_{ab}$ may be favourably determined with the aid of control signals of a device for controlling a driving motor of the positive-displacement device. The end of the discharge time $t_{ab}$ may be favourably determined by measuring a pressure drop in the gas cushion because a significant pressure drop will occur in the gas cushion at the time of complete discharge of the liquid volume. This pressure drop can be measured in both discharging a liquid volume, which was received, in a single discharging step ("pipetting") and stepwise discharging the liquid volume, which was received, in several constant or variable partial steps ("dispensing"), after each partial step. This makes possible a simple electronic measurement of the discharge time.

The ideal gas equation may be advantageously utilized as a gas condition equation. When combined with the volumetric flow, the time demand $\Delta t$ to compress the air cushion may then be determined with reference to the condition when under an ambient pressure $p_o$, as being:

$$\Delta t = (p_{ab} \times V_o)/((p_o + p_{ab}) \times Q). \tag{1}$$

The corrected discharge time $$t_{oab} = t_{ab} - (p_{ab} \times V_o)/((p_o + p_{ab}) \times Q) \tag{2}$$

has then be corrected to the ambient pressure $p_o$. Correction to the ambient pressure $p_o$ is an advantage as it favours the use of a relative-pressure sensor which measures the pressure differential from the ambient pressure $p_o$.

The corrected discharge time $t_{oab}$ can be compared to a desired discharge time $t_{soll}$ which is achieved during proportioning free from proportioning errors or during proportioning including tolerable proportioning errors. In the ideal case where the gas cushion does not undergo compression the volume dislocated by the positive-displacement device is accurately equal to the liquid volume discharged.

Accordingly, the desired discharge time $t_{soll}$ can be calculated as a quotient of the desired volume $V_{soll}$ of the liquid to be discharged and the volumetric gas flow Q delivered by the positive-displacement device.

The correctness and precision of a proportioning device may be verified by weighing liquid volumes which were discharged. The results of these measurements may be utilized for a calibration of the proportioning device. For example, this can be accomplished in such a form that the desired discharge time is calculated as a product of the quotient from the desired volume $V_{soll}$ and the volumetric gas flow Q using a calibration constant $C_{cal}$ where the calibration constant $C_{cal}$ is determined because of a calibration of the proportioning device. Then, the desired discharge time $t_{soll}$ will be calculated as being:

$$t_{soll} = C_{cal} \times V_{soll}/Q. \tag{3}$$

The volumetric gas flow Q delivered by the positive-displacement device can be determined by means of the effective surface $F_{kol}$, and the speed $V_{kol}$ of a positive-displacement element of the positive-displacement device, e.g. a piston of the piston-and-cylinder unit:

$$Q = F_{kol} \times v_{kol}. \tag{4}$$

An advantageous aspect of the method takes into account that the displacing speed of the positive-displacement device is not constant during the discharge time, but may be subjected to acceleration up to a constant final speed. Another advantageous aspect of the method takes into account that the positive-displacement device may have a radial clearance which needs balancing upon reversal of the direction of delivery of the positive-displacement device. This is taken account of by the method by the fact that either an additional time demand $t_{be}$ for an acceleration to a constant final speed and/or an additional time demand $t_s$ for a radial clearance of the positive-displacement device that requires balancing during the positive displacement is deducted from the corrected discharge time $t_{oab}$ or such an additional time demand $t_{be}$ and/or $t_s$ is added to the desired discharge time $t_{soll}$.

The corrected discharge time $t_{oab}$ may be determined in a real time during the pipetting operation. A comparison of the corrected discharge time $t_{oab}$ to the desired discharge time $t_{soll}$ allows a very good control of the accuracy in proportioning. It is particularly the desired volume $V_{soll}$ of the liquid and the speed of displacement $v_{kol}$ of the positive-displacement device which enter the desired discharge time $t_{soll}$ as variables. All of the other variables such as the geometry of the pipette tip, the viscosity of the liquid, etc. are eliminated in this comparison.

According to the second approach, in a method for the controlled proportioning of liquids by means of a positive-displacement device to dislocate a gas cushion and a reception volume connected to the positive-displacement device which has an aperture to the environment for receiving and discharging a liquid by dislocating the gas cushion by means of the positive-displacement device, the pressure p in the gas cushion is measured during a dislocation of the gas cushion, the volume variation $\Delta t\, V$ of the gas cushion is determined by means of a gas condition from the pressure p as measured in the gas cushion, the corrected liquid volume $V_{flüss}$ discharged is calculated by a deduction of the volume variation $\Delta t\, V$ of the gas cushion from the gas volume $V_{gas}$ dislocated by the positive-displacement device at the time t of measuring the pressure p, and the positive-displacement device is stopped when the corrected liquid volume $V_{flüss}$ discharged corresponds to a desired volume $V_{soll}$, or the corrected liquid volume $V_{flüss}$ discharged is calculated at the pressure $p_{ab}$ and the time $t_{ab}$ at the time of a complete discharge of a liquid volume and is compared to a desired volume $V_{soll}$ and the deviation of the corrected liquid volume $V_{flüss}$ from the desired volume $V_{soll}$ is output and/or is saved and/or is resorted to for regulating the discharge of the liquid volume.

In this method, the volume variation $\Delta t\, V$ of the gas cushion is calculated by means of the pressure p measured and the gas volume $V_{gas}$ dislocated by the positive-displacement device is determined and the corrected liquid volume $V_{flüss}$ discharged is calculated by deducting the volume variation $\Delta t\, V$ from the gas volume $V_{gas}$ dislocated. This can be accomplished either permanently or repeatedly through-out the discharge of the liquid and can release the discontinuance of the discharging operation once the corrected liquid volume $V_{flüss}$ discharged corresponds to a desired volume $V_{soll}$. However, it is also possible to determine the corrected liquid volume $V_{flüss}$ discharged for the pressure $p_{ab}$ at the time of a complete discharge of the liquid volume and the time $t_{ab}$ measured therefor and to compare the volume to a desired volume $V_{soll}$. The deviation of the corrected liquid volume $V_{flüss}$ discharged from the desired volume $V_{soll}$, in turn, can be output and/or can be saved and/or can be resorted to for regulating the discharge of the liquid volume as is described above for the deviation of the corrected discharge time $t_{oab}$ from the desired discharge time $t_{soll}$.

According to another advantageous aspect of the method, the volume variation $\Delta t\, V$ of the gas cushion is determined as being $$\Delta t\, V = p \times V_o/(p_o + p) \qquad (5)$$

by means of the value measured for the pressure p in the gas cushion and the ideal gas equation. The gas volume $V_{gas}$ dislocated by the positive-displacement device at the time t of measuring the pressure p can be determined in various ways. Thus, for example, this can be accomplished by measuring the path s which is travelled by a positive-displacement element of the positive-displacement device from the beginning of displacement up to the time t, and by multiplying this path s by the effective surface $f_{kol}$ of the positive-displacement device which, in particular, may be a piston surface. In a positive-displacement device which has a stepping motor, the "path measurement" may also be accomplished by counting the number n of steps with the path s resulting from a multiplication of the steps n by the step size $\Delta t\, s$. In addition, the gas volume $V_{gas}$ dislocated may be determined by a measurement of the time t from the beginning of gas cushion dislocation up to the measurement of the pressure p. As in the measurement described above, the beginning of this time t may be advantageously released by control signals of a device for controlling a driving motor of the positive-displacement device. If a sufficiently accurate assumption is made that the positive-displacement device supplies a constant volumetric gas flow Q the corrected liquid volume $V_{flüss}$ discharged can be calculated as being:

$$V_{flüss} = t \times Q - \Delta V. \qquad (6)$$

According to what was set forth above the volumetric gas flow Q delivered may be determined by means of the effective surface F and the speed $V_{kol}$ of a positive-displacement element of the positive-displacement device. In case of need, an additional time demand $t_{be}$ for an acceleration to a constant final speed and/or an additional time demand $t_s$ for a clearance of the positive-displacement device that requires balancing during the positive displacement may be deducted from the time t.

In an aspect of this regulated proportioning, the positive-displacement device is stopped in such a way that the liquid volume $V_{flüss}$ plus a residual amount of liquid $V_{rest}$ flowing on after the stoppage corresponds to the desired volume $V_{soll}$ of the liquid to be discharged:

$$V_{soll} = V_{flüss} + V_{rest} \qquad (7)$$

Empiric values may be resorted to for the residual amount $V_{rest}$.

The methods described previously relate to the discharge of liquids which already are in the volume to be received. According to an aspect of the method, a liquid volume is received before which corresponds as exactly as possible to the desired volume to be discharged which requires to be discharged by one discharge step or corresponds as exactly as possible to the desired volumes which require to be dispensed by several steps. For example, this may be ensured by designing the proportioning device according to one of the methods which are referred to in EP 0 562 358 B 1 as belonging to the state of the art or as forming the subject matter of this patent. This may further be accomplished by means of measuring the pressure in the gas cushion while the liquid is received. At this stage, the increase of the volume of the gas cushion with regard to the dead volume $V_o$ due to the weight of the liquid column drawn in is calculated by means of the gas condition equation with reference to the pressure measured and the liquid volume really received is calculated taking into account the geometry of the reception volume. The reception of liquid may be regulated until the desired liquid volume is received.

As far as the above methods provide for a regulation of the discharge of liquid volume it is possible to dispense with a liquid reception which is as exact as possible. Preferably, it has to be ensured here that at least the desired volume to be discharged or the sum of the desired volumes to be discharged should be received.

The methods described above are meant for use in proportioning devices having motor-driven positive-displacement devices, particularly for use in electric pipettes or automatic proportioning devices.

The invention will now be explained in greater detail with reference to drawings, graphs, and tables of embodiments, and the measuring results obtained thereby. In the drawings:

FIG. 3 shows the measurement of the pressure in the gas cushion during the discharge of a liquid in a pressure-time graph.

Figure 1:
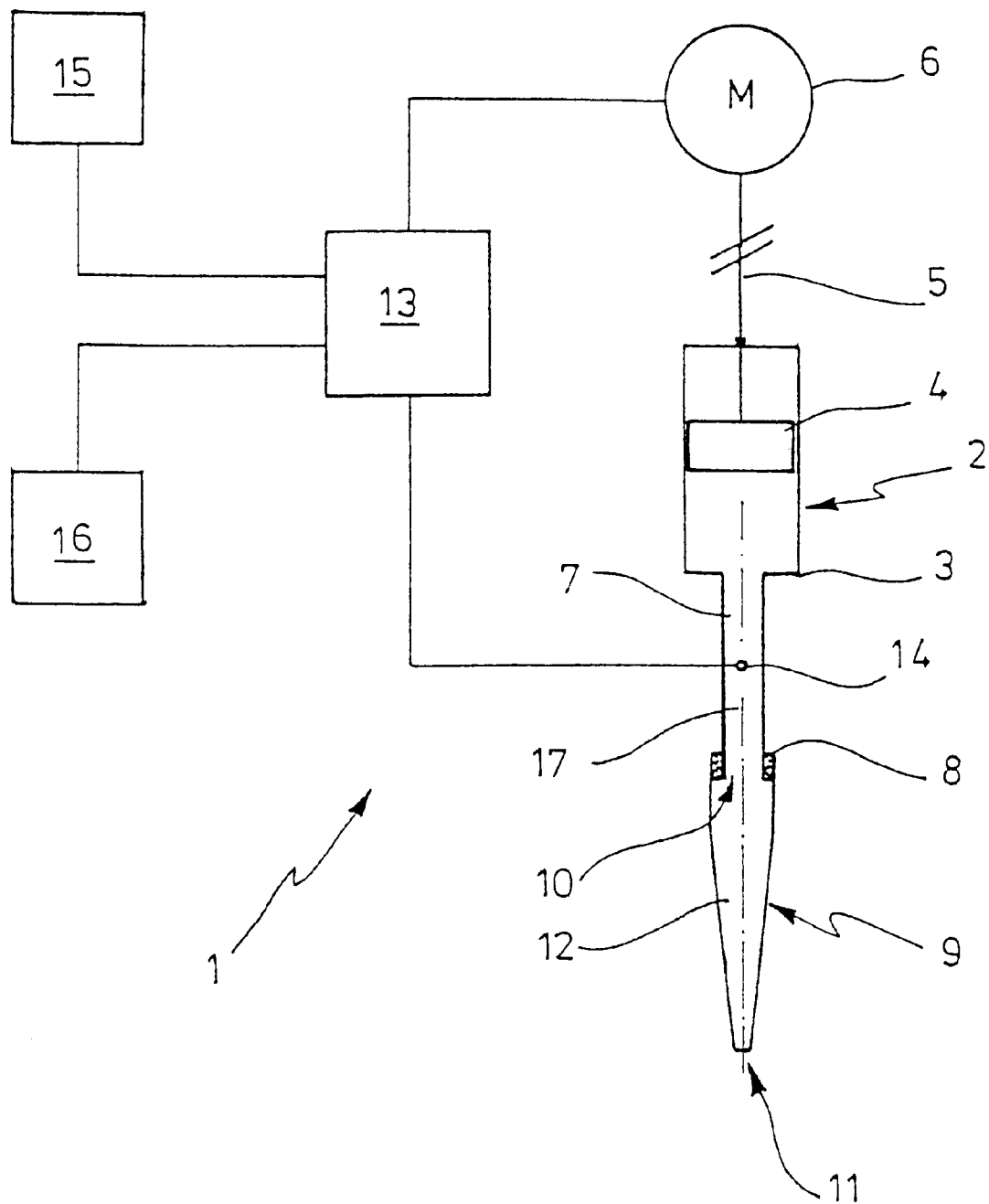
FIG. 1 shows a proportioning device operating according to the inventive method in a roughly schematic representation.

According to FIG. 1, the proportioning device 1 has a positive-displacement device 2 which comprises a piston 4 axially slidable in a cylinder 3. The piston 4 is coupled to an electric driving motor 6 via a spindle drive 5.

The cylinder 3 is connected to a receptacle 8 for a pipette tip 9 via a connecting duct 7. The pipette tip 9 is detachably placed on the receptacle 8 at its upper opening 10. It has a lower opening 11 to receive and discharge a liquid. It has a reception volume 12, in which it can receive a liquid, between the upper opening and lower opening 10, 11.

An electronic control and evaluation system 13 controls the operation of the driving motor 6 and evaluates signals of a pressure sensor 14 which is located in the connecting duct 7. The pressure sensors which can be employed, for example, are those of the model series 40PC of the Honeywell Inc. Company of 11, West Spring Street, Freeport, Ill. 61032.

The electronic control and evaluation system 13 is connected to an input device 15, e.g. a keyboard, and an output device 16, e.g. a display or an audible-signal transmitter.

The user controls the operational mode of the proportioning device by entering control instructions into the input device 15. He can utilize it to choose a liquid volume $V_{soll}$ to be received and to be discharged. Reception is initiated if the pipette tip 9 has dipped its lower aperture 11 into a liquid reservoir. Then, the piston 4 is moved by means of the driving motor 6 so as to urge the gas cushion which is between the underside of the piston and the lower aperture 11 of the pipette tip 9 into the system, and draws a liquid into the pipette tip 9. At this stage, the pressure is measured in the gas cushion by means of the pressure sensor 14.

For a discharge of the liquid volume received, the proportioning unit is caused to move the lower aperture 11 of the pipette tip 9 over the location onto which to discharge the liquid volume, e.g. the opening of a reaction vessel. Initiating the discharging operation causes the piston 4 to be moved back so that the gas cushion 17 urges the liquid volume out of the pipette tip 9. At this stage, the pressure is measured in the gas cushion 17 by means of the pressure sensor 14.

The output device 16, apart from signalling the status of the proportioning unit 1 (the liquid volume set, reception, discharge, non-operative condition, etc.), indicates the pressure P in the gas cushion 17 or a control magnitude derived therefrom or provides a warning message if the amount of liquid received or discharged is not in line with the preset volume $V_{soll}$.

Figure 2:
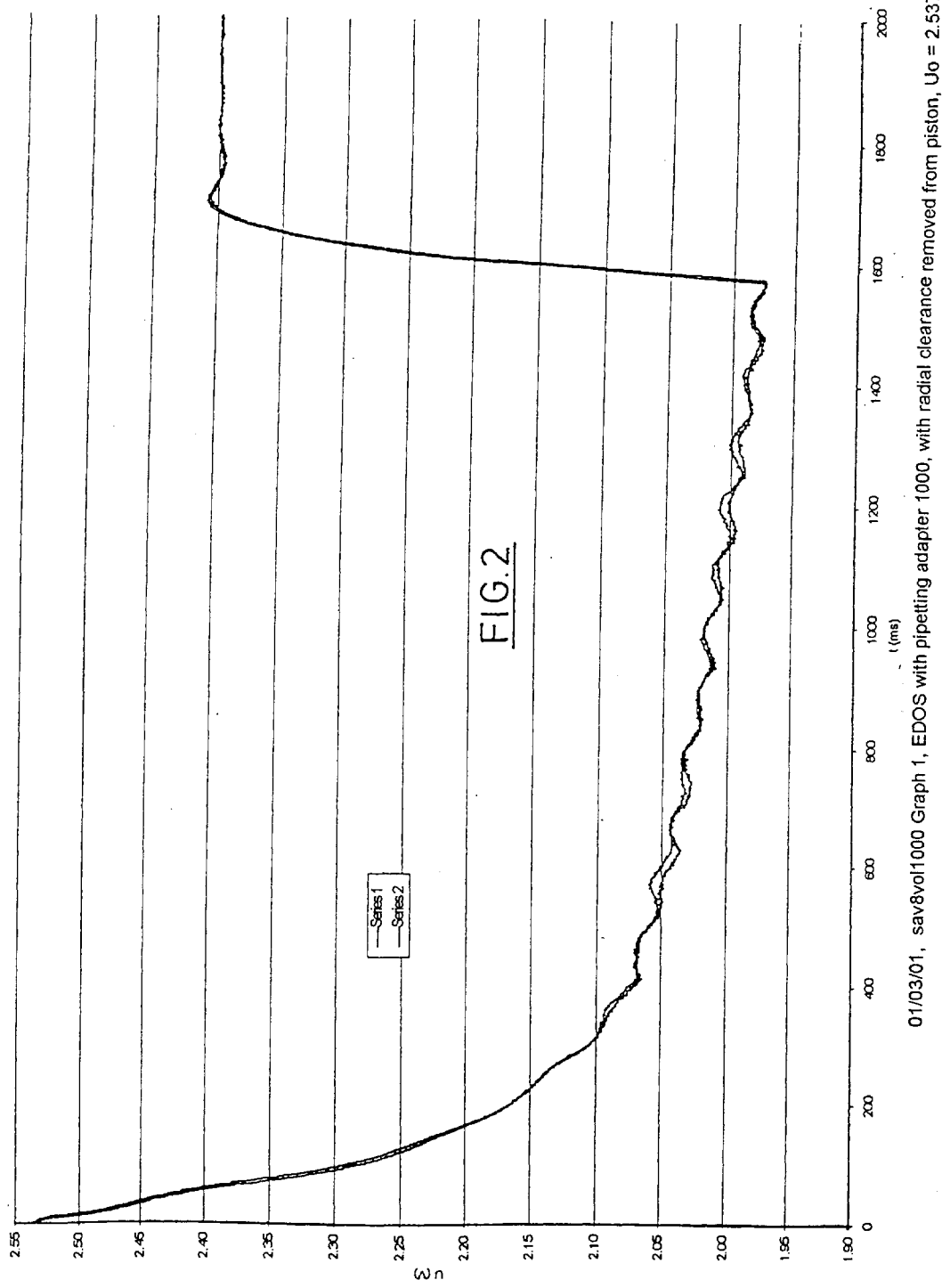
FIG. 2 shows the measurement of the pressure in the gas cushion during the reception of a liquid in a pressure-time graph.

FIG. 2 shows the pressure plots whilst a liquid is received. The plots illustrate the voltage signal U supplied by the pressure sensor in volts over the time in msec for two series of measurements.

The pressure curves shown refer to a reception of 1,000 μl water each where the piston speed of the positive-displacement device was 10 mm per second. The proportioning device was an EDOS type apparatus of the applicant with a pipetting adapter 1000. Measures were taken to reduce the piston's radial clearance.

The pressure sensor has a basic signal $U_0$ of 2.537 volts which exists if the ambient pressure $p_0$ is measured. Starting therefrom, the pressure curves extend to lower voltage values in conformity with the negative pressure produced in the gas cushion. The slopes of the pressure curves gradually decrease up to the completion of reception which features a steep rise of pressure curves up to a value of about 2.40 volts. The negative pressure which remains is based on the fact that the liquid column in the pipette tip "pulls" at the gas cushion, which develops a negative pressure in the gas cushion.

A check of liquid reception is possible by comparing the pressure curves for the reception of liquid to reference curves. An early extraction of the pipette tip from the liquid reservoir because of a mistake in handling would be detectable by a premature rise in the pressure curve. Also, the negative pressure in the gas cushion makes it possible to calculate the amount of liquid received upon termination of the proportioning operation and to check up whether the preset value has been reached.

FIG. 3 shows the pressure curve for the discharge of the liquid for three series of measurements, also for the discharge of volumes of 1,000 μl and at a piston speed of 10 mm per second. The plot again shows the voltage supplied by the pressure sensor in volts over the time in msec.

The pressure curves rise, e.g. starting from the final value of liquid reception with the slope gradually decreasing to values above the primary signal $V_0$, i.e. a positive pressure exists in the gas cushion and expels the liquid from the pipette tip. Once the liquid has been completely expelled the pressure curve abruptly drops from a maximum value of 2.984 volts, which corresponds to a discharge pressure of 14.95 hPa, to the basic signal of 2.537 volts, which corresponds to the ambient pressure $p_0$.

The steep edge of the pressure drop may be used for triggering a measurement of time for the discharge time $t_{ab}$.

Table 1 which follows reports measurements of the discharge time $t_{ab}$ in milliseconds and the discharge pressure $p_{ab}$ in hPa for the partial volumes 1,000, 8,000, 600, 400, and 200 μl and the piston speed in 10, 8.5, 7, 6, 5, 4, 3.5, 3, 2, and 1 mm per second for a certain set-up for tests. A test rig of the applicant was used for the experimental set-up, consisting of the electronic proportioning system EDOS 5222 and the pipetting adapter 1000, and a personal computer including a test value recording card. To measure the pressure in the gas cushion, a pressure sensor 40PC001 of the Honeywell Company was connected to the gas cushion of the pipetting adapter at the pipetting adapter. Generally, small temperature-compensated pressure sensors are recommended which are of a high sensibility of measurement and good linearity. The measuring signals of the pressure sensor were saved in the computer via an analog/digital converter of the test value recording card. When the motor of the proportioning system was started the recording of pressure values was started as well. The discharge pressure $p_{ab}$ and the discharge time $t_{ab}$ were determined from the pressure curves.

The values measured for 1,000 μl and a piston speed of 10 mm per second which are shown in FIG. 3 are included in the table.

Apart from reporting the values measured from the pressure curves $t_{ab}$ and $p_{ab}$, the table indicates the discharge times $t_{oab}$ and $p_{obs}$ which were calculated and corrected.

Below the table, those formulae are shown once more from which the corrected discharge time $t_{oab}$ is determined and which include the ideal gas equation and the equation for the gas volume $\Delta t \, V$ compressed by the positive-displacement device. Furthermore, a legend is given for all of the magnitudes used below the table.

Moreover, the formulae for determining the desired discharge time $t_{soll}$ which take into account a calibration constant $C_{cal}$ are reported once more below the table.

In addition, the value of a calibration constant that results from measurements made is indicated there.

If conditions prevail which match to the conditions during calibration (ambient pressure $p_o$, dead volume $V_o$ ...) those results for $t_{soll}$ require to be referred to as a comparative scale for the discharge time $t_{obs}$ which are determined for new proportioning operations taking into account the discharge pressure, radial clearance, and acceleration of the positive-displacement device. If the deviation exceeds a certain predetermined value an error message is displayed.

| Summary of the pressure curves of 13/12/2000 |||||||||||||
|---|---|---|---|---|---|---|---|---|---|---|---|---|
| | | 1000 |||| 800 |||| 600 ||||
| Vol. | | | taking into account: || | | taking into account: || | | taking into account: ||
| ($\mu$l) | | Values measured || Pressure | Accel. Clear. | Values measured || Pressure | Accel. Clear. | Values measured || Pressure | Accel. Clear. |
| v (mm/s) | $t_{ab}$ (ms) | $P_{ab}$ (hPa) | $t_{oab}$ (ms) | $t_{obs}$ (ms) | $t_{ab}$ (ms) | $P_{ab}$ (hPa) | $t_{oab}$ (ms) | $t_{obs}$ (ms) | $t_{ab}$ (ms) | $P_{ab}$ (hPa) | $t_{oab}$ (ms) | $t_{obs}$ (ms) |
| 9.451 | 1648 | 14.95 | 1585 | 1545.6 | 1340 | 14.88 | 1277 | 1237.6 | 1031 | 14.81 | 968 | 928.6 |
| 8.093 | 1893 | 11.13 | 1838 | 1799.1 | 1533 | 11.23 | 1477 | 1438.1 | 1173 | 11.13 | 1118 | 1079.1 |
| 6.734 | 2254 | 8.22 | 2205 | 2165.0 | 1822 | 8.36 | 1772 | 1732.0 | 1392 | 8.33 | 1342 | 1302.0 |
| 5.798 | 2604 | 6.83 | 2557 | 2514.9 | 2102 | 6.76 | 2055 | 2012.9 | 1595 | 6.86 | 1547 | 1504.9 |
| 4.854 | 3092 | 5.53 | 3046 | 2999.5 | 2494 | 5.73 | 2446 | 2399.5 | 1893 | 5.75 | 1845 | 1798.5 |
| 3.805 | 3936 | 4.66 | 3887 | 3831.7 | 3173 | 4.8 | 3122 | 3066.7 | 2412 | 5.16 | 2357 | 2301.7 |
| 3.363 | 4465 | 5.03 | 4405 | 4343.8 | 3597 | 5.06 | 3537 | 3475.8 | 2731 | 5.06 | 2670 | 2608.8 |
| 2.901 | 5164 | 4.16 | 5106 | 5036.4 | 4166 | 4.64 | 4101 | 4031.4 | 3161 | 4.66 | 3096 | 3026.4 |
| 1.953 | 7663 | 3.83 | 7584 | 7478.7 | 6173 | 4.26 | 6085 | 5979.7 | 4694 | 4.83 | 4594 | 4488.7 |
| 0.987 | 15215 | 5.68 | 14983 | 14779.7 | 12206 | 4.43 | 12025 | 11821.7 | 9267 | 4.77 | 9072 | 8868.7 |

| | | 400 |||| 200 ||||
|---|---|---|---|---|---|---|---|---|---|
| Vol. | 400 ||| taking into account: || | | taking into account: ||
| ($\mu$l) | Values measured || Pressure | Accel. Clear. | Values measured || Pressure | Accel. Clear. |
| v (mm/s) | $t_{ab}$ (ms) | $P_{ab}$ (hPa) | $t_{oab}$ (ms) | $t_{obs}$ (ms) | $t_{ab}$ (ms) | $P_{ab}$ (hpa) | $t_{oab}$ (ms) | $t_{obs}$ (ms) |
| 9.451 | 722 | 14.65 | 660 | 620.6 | 411 | 14.11 | 351 | 311.6 |
| 8.093 | 813 | 11.16 | 758 | 719.1 | 450 | 10.90 | 396 | 357.1 |
| 6.734 | 956 | 8.20 | 907 | 867.0 | 521 | 8.06 | 473 | 433.0 |
| 5.798 | 1093 | 6.59 | 1047 | 1004.9 | 586 | 6.49 | 541 | 498.9 |
| 4.854 | 1290 | 5.56 | 1244 | 1197.5 | 686 | 5.40 | 641 | 594.5 |
| 3.805 | 1644 | 5.36 | 1587 | 1531.7 | 878 | 5.53 | 819 | 763.7 |
| 3.363 | 1862 | 4.59 | 1807 | 1745.8 | 993 | 4.90 | 934 | 872.8 |
| 2.901 | 2155 | 5.16 | 2083 | 2013.4 | 1146 | 4.66 | 1081 | 1011.4 |
| 1.953 | 3201 | 5.00 | 3098 | 2992.7 | 1701 | 4.70 | 1604 | 1498.7 |
| 0.987 | 6316 | 4.43 | 6135 | 5931.7 | 3328 | 4.57 | 3141 | 2937.7 |

$P_o * V_o = (P_o + P_{ab}) * (V_o - \Delta V)$
$\Delta V = Q * \Delta t/1000 = F_{kol} * V_{kol} * \Delta t/1000$
$t_{oab} = t_{ab} - \Delta t = t_{ab} - (P_{ab} * V_o * 1000)/((P_o + P_{ab}) * F_{kol} * V_{kol})$
$t_{obs} = t_{oab} - t_{be} - t_s$
$V_{ab} = (t_{oab} - t_{be} - t_s) * V_{kol} * F_{kol}$
$t_{soll} = (C_{cal} * 1000/F_{kol}) * (V_{soll}/V_{kol})$
The result of the measurements performed was:
$t_{soll} = (1.01241 * 1000/F_{kol}) * (V_{soll}/V_{kol})$
$t_{soll} = 14.58843 * (V_{soll}/V_{kol})$
$P_o$ = Atmospheric pressure, 1,013 hPa
$V_o$ = Dead volume in $\mu$l (2,850 $\mu$l)
$P_{ab}$ = Relative discharge pressure measured, in hPa
$\Delta V$ = Relative variation of dead volume, in $\mu$l
Q = Volumetric flow, in $\mu$l/sec
$\Delta t$ = Time in msec for the product of the relative variation of dead volume $\Delta V$
$F_{kol}$ = Piston surface in sq. mm. (69.398 sq. mm.)
$V_{kol}$ = Piston speed in mm/sec
$T_{oab}$ = Discharge time as corrected to the ambient pressure, in msec
$T_{ab}$ = Discharge time measured in msec
$T_{obs}$ = Discharge time taking into account the discharge pressure, radial clearance, and acceleration
$T_{be}$ = Additional time demand for acceleration ramp, in msec -continued Summary of the pressure curves of 13/12/2000

$T_s$ = Time demand for radial clearance in msec, $s_u$ = reverse clearance in mm, $t_s = 1000 \times s_u/v_{kol}$
$T_{soll}$ = Desired discharge time in msec
$C_{cal}$ = Calibration constant to correct fluctuations in $P_o$, $V_o$, . . .
$V_{soll}$ = Desired discharge volume in $\mu l$
$V_{ab}$ = Discharge volume in l as calculated from discharge time and discharge pressure

What is claimed is:

1. A method for the controlled proportioning of liquids by means of a positive-displacement device (2) to dislocate a gas cushion (17) and a reception volume (12) connected to the positive-displacement device (2) which has an aperture (11) to the environment for receiving and discharging a liquid by dislocating the gas cushion (17) by means of the positive-displacement device (2) wherein the pressure ($p_{ab}$) in the gas cushion (17) is measured at the time of a complete discharge of a liquid volume, the discharge time ($t_{ab}$) for a complete discharge of the liquid volume is measured and the time demand ($\Delta t$) to compress the gas cushion (17) by the positive-displacement device is determined by means of the pressure ($p_{ab}$), the dead volume ($V_o$) of the gas cushion (17), a gas condition equation, and the volumetric gas flow (Q) discharged by the positive-displacement device, a corrected discharge time ($t_{oab}$) is determined as a proportioning control magnitude by a deduction of the time demand ($\Delta t$) from the discharge time ($t_{ab}$) measured, and the deviation of the corrected discharge time ($t_{oab}$) from a desired discharge time ($t_{soll}$) is output and/or is saved and/or is resorted to for regulating the discharge of the liquid volume.

2. The method according to claim 1 where the beginning of the discharge time ($t_{ab}$) is determined by way of control signals of a control device (13) for a driving motor (6) of the positive-displacement device (2).

3. The method according to claim 1 wherein the end of the discharge time ($t_{ab}$) is determined by measuring a pressure drop in the gas cushion (17) at the time of a complete discharge of the liquid volume.

4. The method according to claim 1 wherein the time demand ($\Delta t$) to compress the gas cushion is determined as being $\Delta t = (p_{ab} \times V_o) ((p_o \times p_{ab}) \times Q)$.

5. The method according to claim 1 wherein a desired discharge time ($t_{soll}$) is calculated as the quotient of the desired volume ($V_{soll}$) of the liquid to be discharged and the volumetric gas flow (Q) discharged by the positive-displacement device.

6. The method according to claim 5 wherein the desired discharge time ($t_{soll}$) is calculated by multiplying the quotient $V_{soll}/Q$ by a calibration constant $C_{cal}$.

7. The method according to claim 1 wherein the volumetric gas flow (Q) discharged by the positive-displacement device is determined as being $Q = F_{kol} \times V_{kol}$ by means of the effective surface ($F_{kol}$) and the speed ($V_{kol}$) of a positive-displacement element of the positive-displacement device.

8. The method according to claim 1 wherein either an additional time demand ($t_{be}$) for an acceleration to a constant final speed and/or an additional time demand ($t_s$) for a radial clearance of the positive-displacement divide that requires balancing during the positive-desplacement is deducted from the corrected discharge time $t_{oab}$ or such additional time demand ($t_{be}$, $t_s$) is added to the desired discharge time ($t_{soll}$).

9. The method according to claim 8 wherein a dependence of the additional time demand ($t_{be}$) for an acceleration from the positive-displacement speed ($v_{kol}$) is taken into account.

10. A method for the controlled proportioning of liquids by means of a positive-displacement device (2) to dislocate a gas cushion (17) and a reception volume (12) connected to the positive-displacement device (2) which has an aperture (11) to the environment for receiving and discharging a liquid by dislocating the gas cushion (17) by means of the positive-displacement device (2) wherein the pressure p in the gas cushion (17) is measured during a dislocation of the gas cushion (17), the volume variation ($\Delta V$) of the gas cushion (17) is determined by means of a gas condition equation from the pressure p as measured in the gas cushion (17), the corrected liquid volume ($V_{flüss}$) discharged is calculated by a deduction of the volume variation ($\Delta V$) of the gas cushion (17) from the gas volume ($V_{gas}$) dislocated by the positive-displacement device at the time (t) of measuring the pressure (p), and the positive-displacement device (2) is stopped when the corrected liquid volume ($V_{flüss}$) discharged corresponds to a desired volume ($V_{soll}$), or the corrected liquid volume ($V_{flüss}$) discharged is calculated at the pressure ($p_{ab}$) and the time ($t_{ab}$ at the time of a complete discharge of a liquid volume and is compared to a desired volume ($V_{soll}$) and the deviation of the corrected liquid volume ($V_{flüss}$) from the desired volume ($V_{soll}$) is output and/or is saved and/or is resorted to for regulating the discharge of the liquid volume.

11. The method according to claim 10 wherein the volume variation ($\Delta V$) is determined as being $\Delta V = p \times V_o/(p_o + p)$.

12. The method according to claim 10, where the volumetric gas flow (Q) discharged by the positive-displacement device is determined as being $V_{gas} = t \times Q$ from the volumetric gas flow (Q) discharged thereby and the time (t) measured from the beginning of the positive displacement up to the measurement of the pressure (p).

13. The method according to claim 10, wherein the volumetric gas flow (Q) discharged is determined as being $Q = F_{kol} \times v_{kol}$ by means of the effective surface ($F_{kol}$) and the speed ($v_{kol}$) of a positive-displacement element of the positive-displacement device.

14. The method according to claim 10, wherein the positive-displacement device is stopped in such a way that the calculated liquid volume ($V_{flüss}$) plus a residual amount of liquid ($V_{rest}$) discharged after the stoppage corresponds to the desired volume ($V_{soll}$).

\* \* \* \* \*